(12) United States Patent
Seiler et al.

(10) Patent No.: US 11,742,881 B2
(45) Date of Patent: Aug. 29, 2023

(54) AUTOMATIC PHASE SHIFTING CONTROL LOOP

(71) Applicant: Rockwell Collins, Inc., Cedar Rapids, IA (US)

(72) Inventors: Jeremy J. Seiler, Cedar Rapids, IA (US); Andrew J. Wiebold, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 33 days.

(21) Appl. No.: 17/571,654

(22) Filed: Jan. 10, 2022

(65) Prior Publication Data

US 2023/0223966 A1 Jul. 13, 2023

(51) Int. Cl.
*H04B 1/00* (2006.01)
*H04B 1/04* (2006.01)
*H04B 1/16* (2006.01)

(52) U.S. Cl.
CPC ............. *H04B 1/0064* (2013.01); *H04B 1/04* (2013.01); *H04B 1/1615* (2013.01); *H04B 2001/0408* (2013.01)

(58) Field of Classification Search
CPC .................................................. H04B 1/0064
See application file for complete search history.

(56) References Cited

U.S. PATENT DOCUMENTS

| 5,412,414 A | 5/1995 | Ast et al. |
| 6,233,434 B1 * | 5/2001 | Takei ........................ H01Q 3/26 455/562.1 |
| 8,542,635 B2 | 9/2013 | Han et al. |
| 9,948,407 B2 | 4/2018 | Tang et al. |
| 10,903,567 B2 | 1/2021 | Vehovc et al. |
| 11,005,581 B1 | 5/2021 | Gomadam et al. |

(Continued)

FOREIGN PATENT DOCUMENTS

| EP | 3871291 A1 | 9/2021 |
| WO | 2020150582 A1 | 7/2020 |

OTHER PUBLICATIONS

Kim, Dong-Chan & Park, Seong-Jin & Kim, Tae-Wan & Minz, Laxmikant & Park, Seong-Ook. (2019). Fully Digital Beamforming Receiver With a Real-Time Calibration for 5G Mobile Communication. IEEE Transactions on Antennas and Propagation. pp. 1-1. 10.1109/TAP.2019.2902712.

*Primary Examiner* — Hsinchun Liao
(74) *Attorney, Agent, or Firm* — Suiter Swantz pc llo

(57) ABSTRACT

A transmitter apparatus and method are disclosed. An RF terminal provides an RF signal. A first antenna transmits a first portion of the RF signal and a second antenna transmits a second portion of the RF signal. Directional couplers generate a first monitoring signal and a second monitoring signal. A power comparison operational amplifier receives the first monitoring signal and the second monitoring signal and generates a power difference signal. A phase control operational amplifier receives the power difference signal and a reference input signal and generates a phase control signal. A phase shifter receives the phase control signal, and based on the phase control signal, phase-shifts the RF signal to direct the RF signal to the first antenna, or phase-shifts the RF signal to direct the RF signal to the second antenna.

14 Claims, 2 Drawing Sheets

(56) References Cited

U.S. PATENT DOCUMENTS

| | | | |
|---|---|---|---|
| 2009/0135792 A1* | 5/2009 | Gonikberg | H04B 7/084 370/338 |
| 2016/0268988 A1* | 9/2016 | Jeon | H04B 1/04 |
| 2017/0187109 A1 | 6/2017 | Wang et al. | |
| 2021/0083781 A1 | 3/2021 | Al-Qaq | |
| 2021/0159594 A1 | 5/2021 | Tiebout et al. | |
| 2021/0211335 A1* | 7/2021 | Chen | H03K 5/1565 |

\* cited by examiner

AUTOMATIC PHASE SHIFTING CONTROL LOOP

BACKGROUND

A conventional method of calibrating the power output of a multi-antenna radio frequency (RF) transmitter involves calibrating each antenna mode individually which takes a fixed amount of time. The fixed amount of time increases with each antenna mode calibrated. Although effective at calibrating the power output of each antenna mode, the conventional method is time-consuming and costly.

SUMMARY

A transmitter apparatus is disclosed in accordance with one or more illustrative embodiments of the present disclosure. In one illustrative embodiment, the transmitter apparatus comprises an RF terminal configured to provide an RF signal. In another illustrative embodiment, the transmitter apparatus comprises a first antenna connected to the RF terminal, wherein the first antenna is configured to transmit a first portion of the RF signal. In another illustrative embodiment, the transmitter apparatus comprises a second antenna connected to the RF input terminal, wherein the second antenna is configured to transmit a second portion of the RF signal. In another illustrative embodiment, the transmitter apparatus comprises a first directional coupler configured to split the first portion of the RF signal and generate a first monitoring signal. In another illustrative embodiment, the transmitter apparatus comprises a second directional coupler configured to split the second portion of the RF signal and generate a second monitoring signal. In another illustrative embodiment, the transmitter apparatus comprises an automatic phase shifting control device comprising: a power comparison operational amplifier configured to receive the amplified first monitoring signal and the amplified second monitoring signal and generate a power difference signal, a phase control operational amplifier configured to receive the power difference signal and a reference input signal and generate a phase control signal, and a phase shifter configured to receive the phase control signal, and based on the phase control signal, phase-shift the RF signal to direct the RF signal to the first antenna, or phase-shift the RF signal to direct the RF signal to the second antenna.

A method of power calibration for a transmitter apparatus is disclosed in accordance with one or more illustrative embodiments of the present disclosure. In one illustrative embodiment, the method comprises, using an RF terminal, providing an RF signal, wherein a first antenna is connected to the RF terminal and is configured to transmit a first portion of the RF signal; wherein a second antenna is connected to the RF terminal and is configured to transmit a second portion of the RF signal; using a first directional coupler, splitting the first portion of the RF signal and generating a first monitoring signal; using a second directional coupler, splitting the second portion of the RF signal and generating a second monitoring signal; using a power comparison operational amplifier, receiving the first monitoring signal and the second monitoring signal as differential inputs, and generating a power difference signal; using a phase control operational amplifier, receiving the power difference signal and a reference input signal as differential inputs, and generating a phase control signal; and using a phase shifter, receiving the phase control signal and, based on the phase control signal, phase-shifting the RF signal to direct the RF signal to the first antenna, or phase-shifting the RF signal to direct the RF signal to the second antenna.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which.

DETAILED DESCRIPTION

Figure 1:
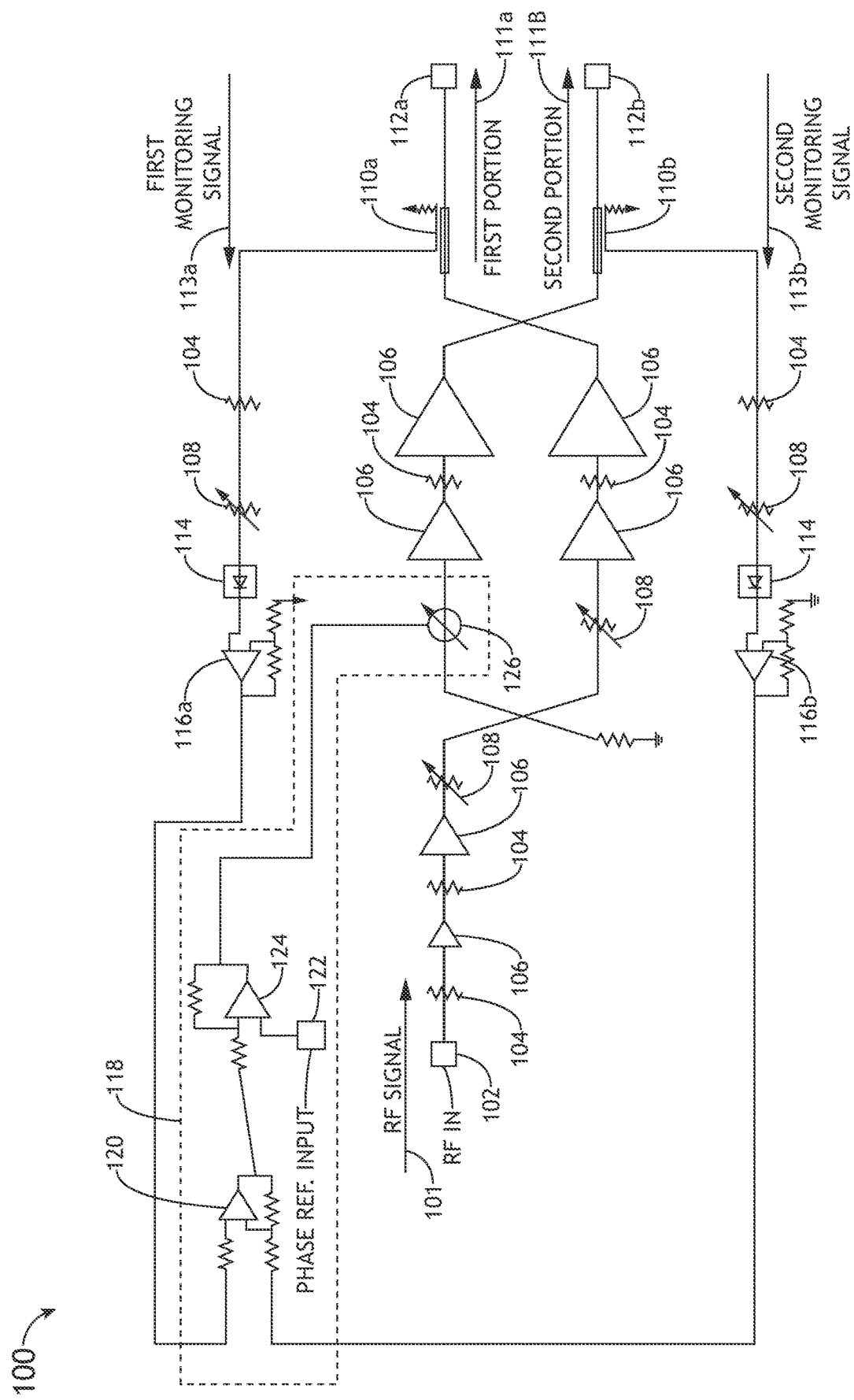
FIG. 1 is a circuit block diagram of a transmitter apparatus including an automatic phase control device, in accordance with one or more embodiments of the present disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the present disclosure, numerous specific details are set forth in order to provide a more thorough understanding of the inventive concepts. However, it will be apparent to one of ordinary skill in the art having the benefit of the present disclosure that the inventive concepts disclosed herein may be practiced without these specific details. In other instances, well-known features may not be described in detail to avoid unnecessarily complicating the present disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). In addition, use of the "a" or "an" are employed to describe elements and components of embodiments of the present inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the present disclosure.

Embodiments of the present disclosure are directed to a transmitter apparatus including an automatic phase control device that directs RF power to each antenna in real-time using a single calibration. A method of calibrating the power output of the transmitter apparatus is also disclosed. The present apparatus and method utilize a low power RF phase shifter (automatically controlled by a feedback loop) to direct RF power to the desired antenna(s) depending on an antenna mode of the transmitter. The present apparatus and method utilize a single control voltage to direct the RF power to the desired antenna(s).

Conventional methods rely on multiple empirical calibration runs for measuring the RF power output during each antenna mode. For example, during a first antenna mode, the power output of a first antenna is measured. During a second antenna mode, the power output of a second antenna is measured. During a combined antenna mode, the power output of the first antenna is individually measured, and the power output of the second antenna is individually measured.

The present apparatus and method may reduce the time required to calibrate a plurality of antennas to the equivalent time required to calibrate a single antenna. Additionally, the present apparatus and method enable the ability to finely tune the performance of each antenna in real time, and simplify future development by providing a pre-made circuit reusable for multiple designs and applications.

FIG. 1 is a circuit block diagram of a transmitter apparatus 100 including an automatic phase control device 118, in accordance with one or more embodiments of the present disclosure. Although the transmitter apparatus 100 is shown as being a transmitter in FIG. 1, it is contemplated that the transmitter apparatus 100 may be, or may be a component of, a transmitter-receiver or a transceiver.

The transmitter apparatus 100 may be configured to output one or more RF signals 101 via antennas 112a and 112b. The RF signal 101 may propagate off the radiating elements of the antennas 112a and 112b as radio waves in the RF range (of from 20 kHz to 300 GHz). In some embodiments, the antennas 112a and 112b are part of an array of antennas 112.

The RF signal 101 may be provided using an RF terminal 102 (e.g., connected to an RF front end). The RF signal 101 may be modulated (e.g., by frequency modulating a carrier signal with an information signal) and may be converted from a digital form to an analog form using a digital-analog-converter (DAC). If the RF signal 101 is modulated by frequency-shift keying (FSK), the instantaneous frequency of the carrier signal may be shifted among a set of frequencies to encode the information signal (e.g., the frequencies may represent digits, such as '0' and '1').

The transmitter apparatus 100 may include a plurality of output channels between each antenna 112a, 112b and the RF terminal 102. The output channels may include one or more amplifiers 106, one or more attenuators 104, and one or more variable attenuators 108. The amplifiers 106 may be configured to increase the power of the RF signal 101. In some embodiments, the amplifiers 106 may amplify frequencies in the RF range between 20 kHz and 300 GHz. The attenuators 104 and variable attenuators 108 may lower power, dissipate power, and improve impedance matching between different elements of the apparatus 100. The variable attenuators 108 may be adjustable by switching between different attenuations (stepped attenuators) or using potentiometers (continuously adjustable resistors).

The distribution of the power of the RF signal 101 to each antenna 112a, 112b may be controlled depending on an antenna transmission mode (or antenna mode) of the transmitter apparatus 100. A first portion 111a of the RF signal may be output by the antenna 112a and a second portion 111b of the RF signal may be output by the antenna 112b. The antenna mode of the transmitter apparatus 100 may be defined or set by a user of the transmitter apparatus 100 (for example, using a button, dial, switch, keyboard or other input device).

When the transmitter apparatus 100 is in a first antenna mode (e.g., "Antenna A Mode"), the antenna 112a may transmit 100% of the total power of the RF signal 101. The first portion 111a transmitted by antenna 112a may be 100% of the total power of the RF signal 101 and the second portion 111b transmitted by antenna 112b may be 0% of the total power of the RF signal 101 (in other words, antenna 112a is in an on state, and antenna 112b is in an off state).

Likewise, when the transmitter apparatus 100 is in a second antenna mode (e.g., "Antenna B Mode"), the antenna 112b may transmit 100% of the total power of the RF signal 101. The first portion 111a transmitted by antenna 112a may be 0% of the total power of the RF signal 101 and the second portion 111b transmitted by antenna 112b may be 100% of the total power of the RF signal 101 (in other words, antenna 112a is in an off state, and antenna 112b is in an on state).

When the transmitter apparatus 100 is in a combined antenna mode (e.g., "Antenna A+B Mode"), each antenna 112a-b may be configured to transmit half of the total power of the RF signal 101. The first portion 111a transmitted by antenna 112a may be 50% of the total power of the RF signal 101 and the second portion 111b transmitted by antenna 112b may be 50% of the total power of the RF signal 101 (in other words, both antenna 112a and antenna 112b are in an on state). During the combined antenna mode, the total power of the RF signal 101 is distributed evenly to each of the antennas 112a-b.

The transmitter apparatus 100 may include a first directional coupler 110a and a second directional coupler 110b. The directional couplers 110a and 110b may be configured to divide or split the portions 111a-b of the RF signal at each antenna 112a-b (and may thus function as power dividers or power splitters). The directional couplers 110a-b may each respectively draw a fraction of the respective portion 111a-b of the RF signal 101 to generate respective monitoring signals 113a-b. The monitoring signals 113a-b may be used to continuously calibrate the power output of each antenna 112a-b of the transmitter apparatus 100.

The first directional coupler 110a may be configured to split the first portion 111a of the RF signal 101 (transmitted by antenna 112a) to generate a first monitoring signal 113a. The first monitoring signal 113a may have a power that is a fraction of the power of the first portion 111a of the RF signal 101 (for example, 1/20 or 5%). For example, when the power of the first portion 111a of the RF signal 101 is 20 W, the power of the first monitoring signal 113a is 1 W.

The second directional coupler 110b may be configured to split the second portion 111b of the RF signal 101 (transmitted by antenna 112b) to generate a second monitoring signal 113b. The second monitoring signal 113b may have a power that is a fraction of the power of the second portion 111b of the RF signal 101 (for example, 1/20 or 5%). For example, when the power of the second portion 111b of the RF signal 101 is 20 W, the power of the second monitoring signal 113b is 1 W.

The power of the first monitoring signal 113a may be of from 0.1% to 10% of the power of the first portion 111a of the RF signal 101. The power of the second monitoring signal 113b may be of from 0.1% to 10% of the power of the second portion 111b of the RF signal 101. In this way, a small fraction of the total power of the RF signal 101 may be used for power calibration, and the rest of the RF signal 101 may be used for transmitting radio waves by the antennas 112a-b.

A first diode detector 114 may be configured to detect an envelope of the first monitoring signal 113a and may convert the first monitoring signal 113a to a constant voltage amplitude (e.g., from an FM modulated RF signal with a time-varying voltage amplitude). Likewise, a second diode detector 114 may be configured to detect an envelope of the second monitoring signal 113b and may convert the second monitoring signal 113b to a constant voltage amplitude. The term "envelope" may be construed as a smooth curve outlining the extremes of the oscillating RF signal 101.

A first operational amplifier 116a may be configured to amplify the first monitoring signal 113a. The first operational amplifier 116a may be connected to ground and the first monitoring signal 113a as differential inputs, and may generate an amplified first monitoring signal 113a as an output. A second operational amplifier 116b may be configured to amplify the second monitoring signal 113b. The second operational amplifier 116b may be connected to ground and the second monitoring signal 113b as differential inputs, and may generate an amplified second monitoring signal 113b as an output. Each of the operational amplifiers 116a-b may include negative feedback circuits that improve the stability, change gain, and reduce noise or distortion.

The transmitter apparatus 100 may include an automatic phase shifting control device 118 comprising a power comparison operational amplifier 120, a reference input signal 122, a phase control operational amplifier 124, and a phase shifter 126.

The power comparison operational amplifier 120 may be configured to receive the amplified first monitoring signal 113a and the amplified second monitoring signal 113b as differential inputs, and generate a power difference (i.e., delta) signal as output. The power difference signal may be proportional to a difference between the power of the first portion 111a of the RF signal 101 transmitted by the first antenna 112a and the power of the second portion 111b of the RF signal 101 transmitted by the second antenna 112b.

The power difference signal may be used as a measurement for power calibration. For example, during a first antenna mode, the transmitter apparatus 100 may be configured to transmit 100% of the power of the RF signal 101 using the antenna 112a and 0% of the power using antenna 112b, and thus the power difference signal may have a target amplitude of +1.00 V (although other amplitude values are possible).

In one example, during the first antenna mode, some of RF signal 101 is disadvantageously output by the second antenna 112b (e.g., 97% is transmitted by antenna 112a and 3% is transmitted by antenna 112b), and the power difference signal has an amplitude of +0.97 V, indicating that an adjustment is required to increase the power output by antenna 112a and decrease the power output by antenna 112b.

The target amplitude of the power difference signal for the second antenna mode may be, for example, −1.00V (indicating that 100% of the power of the RF signal 101 is transmitted by antenna 112b). In one example, during the second antenna mode, some of RF signal 101 is disadvantageously output by the first antenna 112a (e.g., 90% is transmitted by antenna 112b and 10% is transmitted by antenna 112a), and the power difference signal has an amplitude of −0.90 V, indicating that an adjustment is required to increase the power output by antenna 112b and decrease the power output by antenna 112a.

The target amplitude of the power difference signal for the combined antenna mode may be, for example, 0 V (indicating that 50% of the power of the RF signal 101 is transmitted by antenna 112a and 50% of the power of the RF signal 101 is transmitted by antenna 112b).

The phase control operational amplifier 124 may be configured to receive the power difference signal and a reference input signal 122 as differential inputs, and generate a phase control signal as output. The voltage of the power difference signal may be subtracted from the voltage of the reference input signal 122. The resulting phase control signal may be used to adjust the power output by the first antenna 112a or the second antenna 112b. The phase control signal may be proportional to the amount of adjusted power directed to the antenna 112a or the antenna 112b.

The voltage of the reference input signal 122 may differ based on the transmitter apparatus 100 being in the first antenna mode, the second antenna mode, or the combined antenna mode. In some embodiments, the voltage of the reference input signal 122 may be equal to a target amplitude of the power difference signal for the corresponding antenna mode. For example, during the first antenna mode, the voltage of the reference input signal 122 may be +1.00 V. During the second antenna mode, the voltage of the reference input signal 122 may be −1.00 V. During the combined antenna mode, the voltage of the reference input signal 122 may be 0 V.

The phase shifter 126 may receive the phase control signal, and, based on the value of the phase control signal, phase-shift the RF signal 101 (e.g., at an output channel between the RF terminal 102 and one of the antennas 112a-b) by adjusting a phase angle of the RF signal 101. The phase shifter 126 may be an active phase shifter or a passive phase shifter, and may comprise a transmission line or a waveguide. The phase angle adjustment may be proportional to the voltage of the phase control signal and the voltage of power difference signal. Therefore, the phase angle adjustment may be proportional to a difference between the power of the first portion 111a of the RF signal 101 transmitted by the first antenna 112a and the power of the second portion 111b of the RF signal 101 transmitted by the second antenna 112b.

The phase angle adjustment performed by the phase shifter 126 may increase the power of the first portion 111a of the RF signal 101 transmitted by the first antenna 112a (for example, during the first antenna mode). Alternatively, the phase angle adjustment performed by the phase shifter 126 may increase the power of the second portion 111b of the RF signal 101 transmitted by the second antenna 112b (for example, during the second antenna mode). In this way, RF power may be directed to the appropriate antenna 112a-b depending on an antenna mode of the transmitter apparatus 100.

Figure 2:
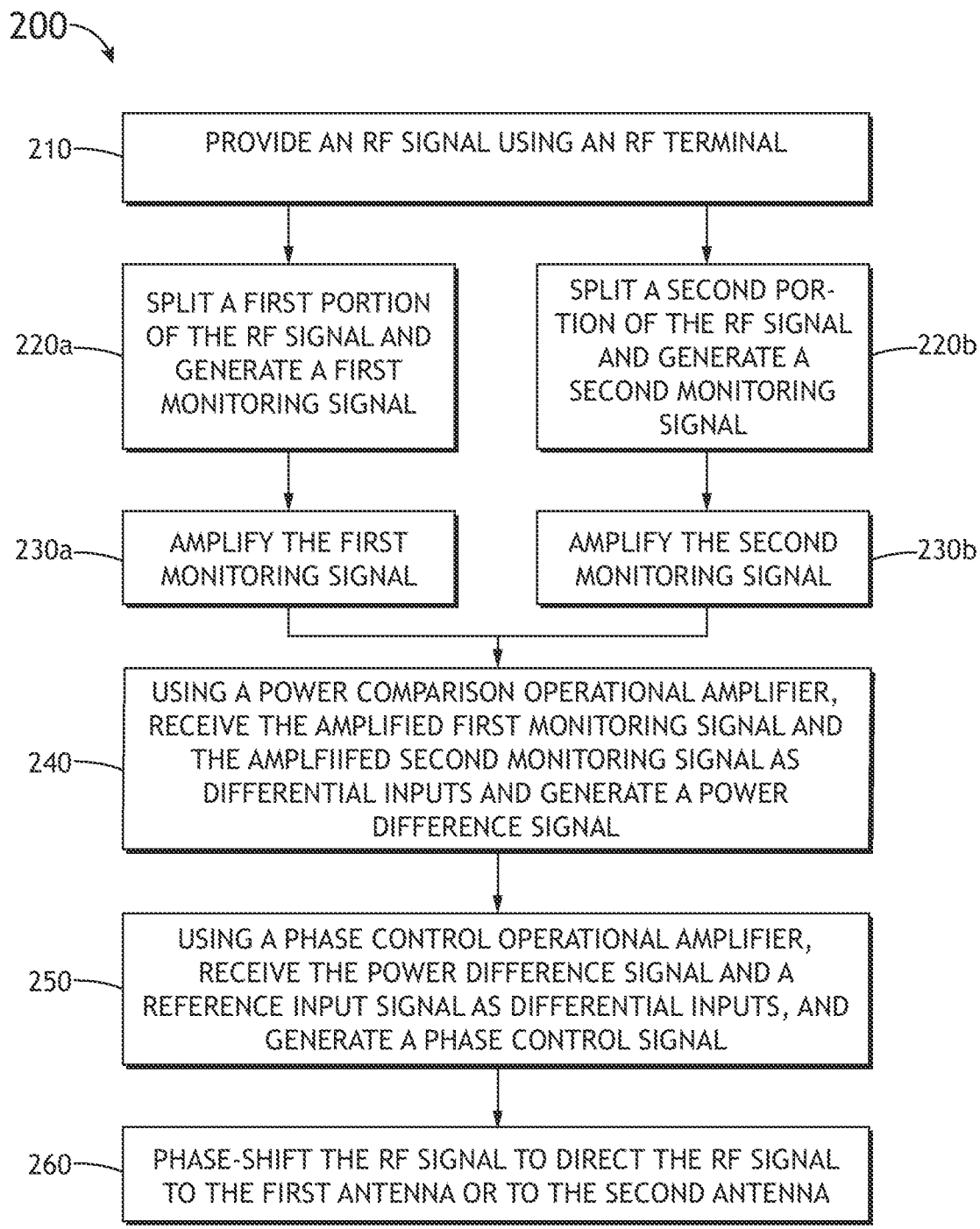
FIG. 2 is a flow chart illustrating a method of power calibration for a transmitter apparatus, in accordance with one or more embodiments of the present disclosure.

FIG. 2 is a flow chart illustrating a method 200 of power calibration for a transmitter apparatus, in accordance with one or more embodiments of the present disclosure. The method 200 may calibrate the transmitter apparatus 100 described with respect to FIG. 1.

At step 210, an RF signal may be provided by an RF terminal. The RF signal may be frequency modulated and may be converted from a digital form to an analog form using a DAC. A first antenna may be configured to transmit a first portion of the RF signal and a second antenna may be configured to transmit a second portion of the RF signal.

At step 220a, a first portion of the RF signal may be split, and a first monitoring signal may be generated. Similarly, at step 220b, a second portion of the RF signal may be split, and a second monitoring signal may be generated.

At step 230a, the first monitoring signal is received by a first operational amplifier and amplified. Similarly, at step 230b, the second monitoring signal is received by a second operational amplifier and amplified.

At step 240, the amplified first monitoring signal and the amplified second monitoring signal may be received as differential inputs by a power comparison operational amplifier, and a power difference signal may be generated. The power difference signal may be proportional to a difference of the power output by the first antenna and the power output by the second antenna.

At step 250, the power difference signal and a reference input signal may be received by a phase control operational amplifier as differential inputs, and a phase control signal may be generated. The voltage of the reference input signal may be selected based on an antenna mode of the transmitter apparatus. For example, a first reference signal voltage may be used in a first antenna mode (so that 100% of the power of the RF signal is output by the first antenna), a second reference signal voltage may be used in a second antenna mode (so that 100% of the power of the RF signal is output by the second antenna), and a third reference signal voltage may be used in a combined antenna mode (so that each antenna outputs 50% of the power of the RF signal).

At step 260, the RF signal is phase-shifted based the phase control signal. The phase angle adjustment may be proportional to an amplitude of the phase control signal. Depending on the amplitude of the phase control signal and the antenna mode of the transmitter, the power of the first portion of the RF signal may be increased, or a power of the second portion of the RF signal may be increased.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A transmitter apparatus, comprising:
   an RF terminal configured to provide an RF signal;
   a first antenna connected to the RF terminal, wherein the first antenna is configured to transmit a first portion of the RF signal;
   a second antenna connected to the RF terminal, wherein the second antenna is configured to transmit a second portion of the RF signal;
   a first directional coupler configured to split the first portion of the RF signal and generate a first monitoring signal;
   a second directional coupler configured to split the second portion of the RF signal and generate a second monitoring signal;
   an automatic phase shifting control device comprising:
      a power comparison operational amplifier configured to receive the first monitoring signal and the second monitoring signal and generate a power difference signal,
      a phase control operational amplifier configured to receive the power difference signal and a reference input signal and generate a phase control signal, and
      a phase shifter configured to receive the phase control signal, and based on the phase control signal, phase-shift the RF signal to direct the RF signal to the first antenna, or phase-shift the RF signal to direct the RF signal to the second antenna.

2. The transmitter apparatus of claim 1, comprising:
   a first operational amplifier configured to amplify the first monitoring signal; and
   a second operational amplifier configured to amplify the second monitoring signal.

3. The transmitter apparatus of claim 1, wherein the power difference signal is proportional to a difference between a power of the first portion of the RF signal transmitted by the first antenna and a power of the second portion of the RF signal transmitted by the second antenna.

4. The transmitter apparatus of claim 3, wherein, responsive to the transmitter apparatus being in a first antenna mode, the power of the first portion of the RF signal transmitted by the first antenna is 100% of a total power of the RF signal, and the power of the second portion of the RF signal transmitted by the second antenna is 0% of the total power of the RF signal.

5. The transmitter apparatus of claim 4, wherein, responsive to the transmitter apparatus being in a second antenna mode, the power of the first portion of the RF signal transmitted by the first antenna is 0% of the total power of the RF signal, and the power of the second portion of the RF signal transmitted by the second antenna is 100% of the total power of the RF signal.

6. The transmitter apparatus of claim 5, wherein, responsive to the transmitter apparatus being in a combined antenna mode, the power of the first portion of the RF signal transmitted by the first antenna is 50% of the total power of the RF signal, and the power of the second portion of the RF signal transmitted by the second antenna is 50% of the total power of the RF signal.

7. The transmitter apparatus of claim 6, wherein a voltage of the reference input signal differs based on the transmitter apparatus being in the first antenna mode, the second antenna mode, or the combined antenna mode.

8. A method of power calibration for a transmitter apparatus, comprising:
   providing an RF signal using an RF terminal,
   wherein a first antenna is connected to the RF terminal and is configured to transmit a first portion of the RF signal;
   wherein a second antenna is connected to the RF terminal and is configured to transmit a second portion of the RF signal;

using a first directional coupler, splitting the first portion of the RF signal and generating a first monitoring signal;
using a second directional coupler, splitting the second portion of the RF signal and generating a second monitoring signal;
using a power comparison operational amplifier, receiving the first monitoring signal and the second monitoring signal as differential inputs, and generating a power difference signal;
using a phase control operational amplifier, receiving the power difference signal and a reference input signal as differential inputs, and generating a phase control signal; and
using a phase shifter, receiving the phase control signal and, based on the phase control signal, phase-shifting the RF signal to direct the RF signal to the first antenna, or phase-shifting the RF signal to direct the RF signal to the second antenna.

9. The method of claim 8, further comprising:
using a first operational amplifier, amplifying the first monitoring signal; and
using a second operational amplifier, amplifying the second monitoring signal.

10. The method of claim 8, wherein the power difference signal is proportional to a difference between a power of the first portion of the RF signal transmitted by the first antenna and a power of the second portion of the RF signal transmitted by the second antenna.

11. The method of claim 10, wherein, responsive to the transmitter apparatus being in a first antenna mode, the power of the first portion of the RF signal transmitted by the first antenna is 100% of a total power of the RF signal, and the power of the second portion of the RF signal transmitted by the second antenna is 0% of a total power of the RF signal.

12. The method of claim 11, wherein, responsive to the transmitter apparatus being in a second antenna mode, the power of the first portion of the RF signal transmitted by the first antenna is 0% of the total power of the RF signal, and the power of the second portion of the RF signal transmitted by the second antenna is 100% of the total power of the RF signal.

13. The method of claim 12, wherein, responsive to the transmitter apparatus being in a combined antenna mode, the power of the first portion of the RF signal transmitted by the first antenna is 50% of the total power of the RF signal, and the power of the second portion of the RF signal transmitted by the second antenna is 50% of the total power of the RF signal.

14. The method of claim 13, wherein a voltage of the reference input signal differs based on the transmitter apparatus being in the first antenna mode, the second antenna mode, or the combined antenna mode.

* * * * *